(12) United States Patent
Myers

(10) Patent No.: US 8,436,837 B2
(45) Date of Patent: May 7, 2013

(54) STYLUS INPUT SYSTEM

(75) Inventor: Bob Myers, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 12/712,428

(22) Filed: Feb. 25, 2010

(65) Prior Publication Data

US 2011/0205244 A1  Aug. 25, 2011

(51) Int. Cl.
*G06F 3/033* (2006.01)
(52) U.S. Cl.
USPC .............. 345/179; 178/19.03; 178/19.05
(58) Field of Classification Search .......... 345/173–184; 178/18.01–18.09, 18.11, 19.01–19.07
See application file for complete search history.

(56) References Cited

U.S. PATENT DOCUMENTS

| 5,105,186 | A  | * | 4/1992  | May .............................. 345/175 |
| 6,498,602 | B1 | * | 12/2002 | Ogawa .......................... 345/173 |
| 7,969,426 | B2 | * | 6/2011  | Skillman et al. ............... 345/175 |
| 2008/0100593 | A1 |   | 5/2008  | Skillman et al. |

FOREIGN PATENT DOCUMENTS

WO    WO/00/70551    11/2000

* cited by examiner

*Primary Examiner* — Vijay Shankar
(74) *Attorney, Agent, or Firm* — Romiwa C. Akpala

(57) ABSTRACT

Embodiments of the present invention enable stylus input on a display device coupled to a processor. According to one embodiment, a stylus control unit detects the presence of a stylus within a display area of a display device and then displays a pair of frames including luminescent images on the display device. Furthermore, luminescent measurement data is transmitted from the stylus to the stylus control unit, and stylus position information is sent to a computer processor based on the received luminescent measurement data.

20 Claims, 4 Drawing Sheets

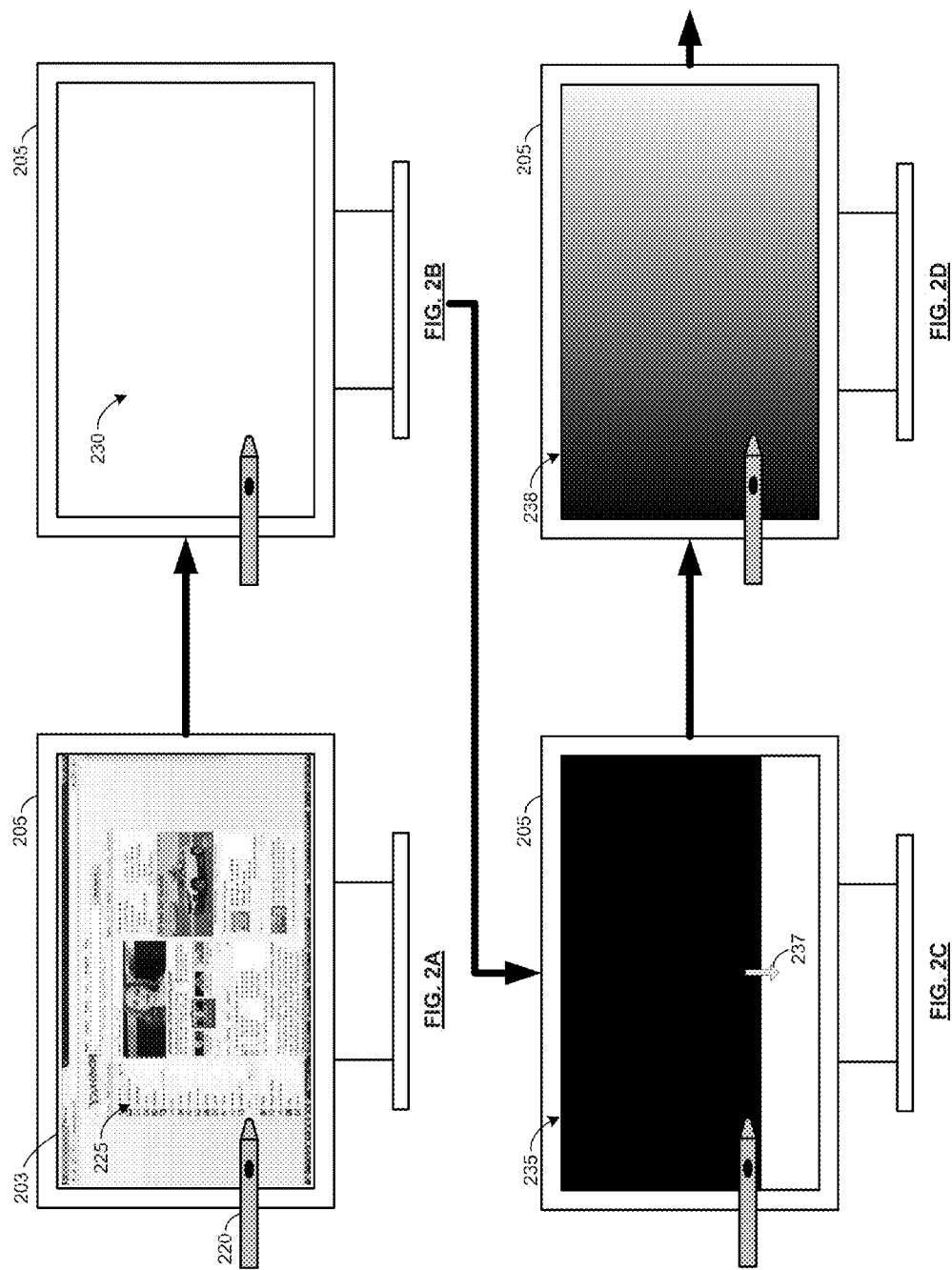

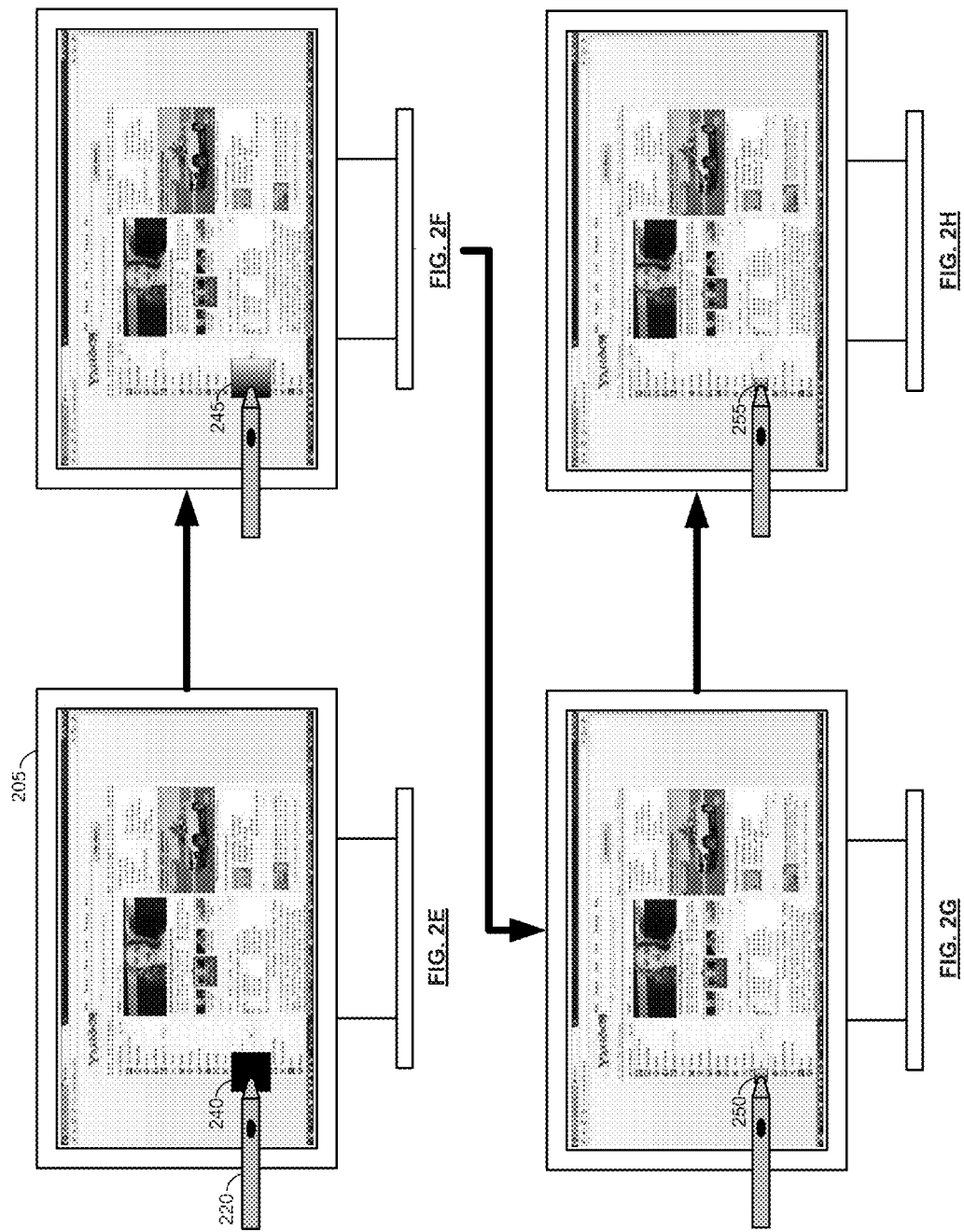

STYLUS INPUT SYSTEM

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on the display. As computer systems have grown in popularity, however, alternate input systems have been developed. For example, stylus input systems provide a natural user interface to computer systems by enabling a specific point on the display screen to be selected or identified when the user physically touches the display with a pen-like device or stylus.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 2A-2H illustrates an exemplary process flow of the stylus input system according to an embodiment of the present invention.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional stylus input systems require additions or modification to the display device itself, such as overlay panels for detecting the touch point, radio frequency sensing systems, infrared emitters and detectors, and the like. Accordingly, these modifications add significant cost to the display and computer system, and often results in at least some degree of performance degradation with respect to the displayed image quality. Furthermore, since the sensing hardware must be included in the display, stylus input capability cannot readily be added to displays which do not include sensing hardware at the time of manufacture.

Embodiments of the present invention disclose a stylus input system and method in which stylus or pen-input functionality can be added to an existing display unit. According to one embodiment, a stylus control unit is connected between the display device and the computer processor (e.g. video source), and a stylus is used to point to a desired spot on the display screen. The stylus control unit is configured to display frames of images or patterns that divide the display screen into several regions, each with a different luminance, or light level (i.e. black to white). The stylus is configured to sense the varying luminance levels shown on the display screen and transmit luminance measurement data to the stylus control unit. On successive frames, the control unit outputs new image frames, over successively smaller areas, until the location of the pen is determined to a desired accuracy. Since the stylus control unit and stylus are completely external to the display unit itself, these components may be easily added to any display at any time.

Figure 1:
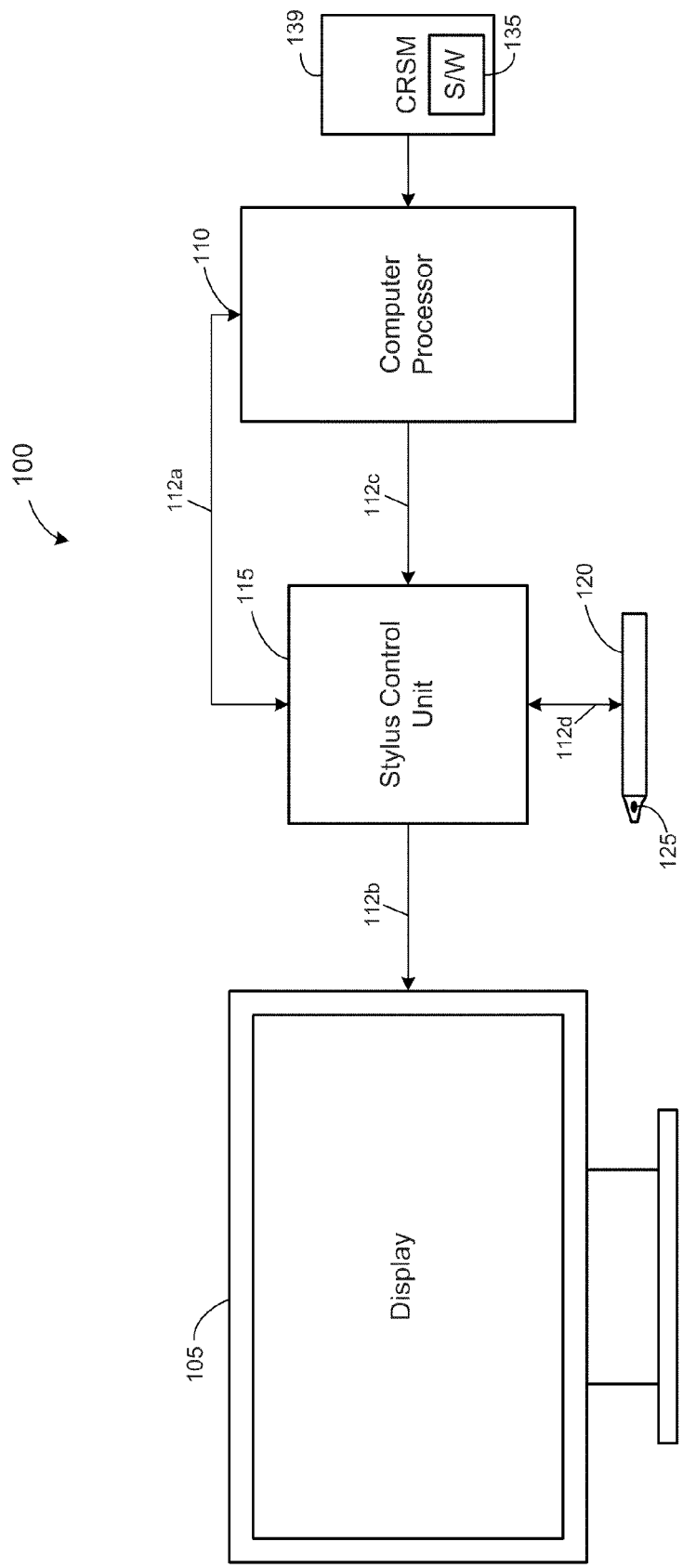
FIG. 1 is a simplified block diagram of the stylus input system according to an embodiment of the present invention.

FIG. 1 is a simplified block diagram of the stylus input system according to an embodiment of the present invention. As shown in FIG. 1, the stylus input system 100 includes a display unit 105, a stylus control unit 115, a computer processor 110, and a stylus 120. The computer processor 110 may be coupled to a computer-readable storage medium (CRSM) 139 that may include volatile storage (e.g. random access memory, non-volatile storage (e.g. hard disk drive, read-only memory, compact click read only memory, flash storage, etc.), or combinations thereof. Furthermore, CRSM 139 may contain software 135 that is executable by processor 110 and, that when executed, causes the processor 110 to perform some or all of the functionality described herein. In addition, CRSM 139 may be coupled to, or embedded within, the stylus control unit 115.

According to this exemplary embodiment, the stylus control unit 115 is connected between the display unit 105 and the computer processor 110, and is configured to interface the display unit 105 with the computer processor 110. Specifically, connection 112a serves as the video connection between the video source (i.e. computer processor 110) and stylus control unit 115, while connection 112b serves as the video connection between that display unit 105 and stylus control unit 115. When the stylus 120 is not in use, the stylus control unit 115 simply passes video through connections 112b and 112c. Furthermore, connection 112a serves as a bidirectional data channel between the stylus control unit 115 and the computer processor 110. In one embodiment, connection 112a interfaces these devices via a universal serial bus (USB) connection. Still further, connection 112d interfaces the stylus 120 and the stylus control unit 115, and may be either a wired or wireless connection such as a radio frequency or infrared link for example.

According to one embodiment of the present invention, stylus 120 represents a narrow elongated pen-like and light-sensing device configured to discriminate a moderate number of differing luminescent levels emitted on the display unit 105. In particular, stylus 120 includes a light sensor 125 configured to discriminate two-dimensional patterns and light levels within its field of view. In one embodiment, a CMOS active-pixel sensor is utilized as the light sensor 125 of the stylus 120 and should be capable of accurately discriminating at least eight different levels of luminance, namely from deep black to peak white (i.e. no color detection), within a single frame.

FIGS. 2A-2H illustrates an exemplary set of images displayed by the stylus input system according to an embodiment of the present invention. In FIG. 2A, the stylus 220 is brought within a display area of the display unit 205. If the stylus includes a pressure sensor on a tip area thereof, the presence of the stylus may be detected by the stylus control unit through detection of pressure of the stylus tip on the surface of the display screen. Stylus presence within a display area of the display screen may also be detected when the image sensor of the stylus is able to detect light output by the display screen and then relays the information to the stylus control unit. Accordingly, the display area may be the surface of the entire display screen, or the field of view of the image sensor that is capable of sensing light output from the display screen (e.g. one foot in front of the display screen).

As shown in the exemplary embodiment of FIG. 2A, the display unit 205 is displaying a video source, or web page at the time of detecting the presence of the stylus 220 within the display area. Upon detection of the stylus presence, the stylus control unit, which is synchronized to the video source's video timing, executes programming instructions to interrupt the video source of the computer processor and displays a new image frame 230 shown in FIG. 2B. According to one embodiment, the new image frame 230 is a solid white image that spans the width and length of the display screen so as to establish the current peak white luminance setting as detected by the image sensor of stylus 220.

FIGS. 2C and 2D depict an exemplary pair of image frames that permit the stylus control unit to approximately determine the location of the stylus on the display screen. As shown in FIG. 2C, a full-sized black image 235 is displayed on the display screen. This black image 235 scrolls downward from the top of the display screen 205 as indicated by arrow 237, ultimately overwriting the previously displayed white image 230. The overwriting of the previous white image 230 is eventually detected by the image sensor of the stylus 220 at its specific position (within field of view), and the time elapsed since the start of second frame (i.e. black image) up until the detection by stylus sensor will give an approximate indication of the stylus position vertically ("y" coordinate) on the display screen 205. Next, and as shown in FIG. 2D, the stylus control unit displays another image frame on the display screen comprising of a horizontally-shaded image or pattern. Similar to the detection of the "y" coordinate as described above, the approximate "x" coordinate may be determined by detecting, via the image sensor of the stylus, the specific luminance level of the region of the display screen that corresponds with the current position of the stylus. Moreover, the luminescent pattern shown in FIG. 2D may not start with a pure black shade, but rather the minimum luminance level in this image pattern may be selected so as to be greater than the point at which the image sensor would require additional time for determining the luminance to the desired level of accuracy.

FIGS. 2E-2H depict two additional pairs of image frames output by the stylus control unit in accordance with embodiments of the present invention. On subsequent frames, the process described above is repeated, but involving smaller portions of the display screen and using the previously-determined approximate "x" and "y" coordinates of the stylus as the center points for the new image frames. More specifically, and as shown in the exemplary embodiments of FIGS. 2E-2F, the displayed image frames 240 and 245 form a pair of image frames that are smaller than the previously displayed image frames 230 and 238 shown in FIGS. 2C and 2D. Furthermore, the displayed image frames 250 and 255 shown in FIGS. 2G and 2H are smaller than the displayed image frames 240 and 245 of FIGS. 2E and 2F. Moreover, both pairs of image frames 240, 245 and 250, 255 have central points that correspond to the approximate "x" and "y" coordinates determined by the respective previous image frames (i.e. 230, 238 and 240, 245 respectively). Thus, the precise (x, y) coordinates of the stylus is refined over several successive image frames, each frame pair using smaller regions of the display screen 205. Once this process is complete, the stylus control unit may send stylus positional information to the computer processor.

According to embodiment of the present invention, each pair of frames after the first luminescent frame (i.e. white calibration frame) will determine the stylus location to within approximately one-eighth of the dimension of the area filled by image in the "x" and "y" directions. Moreover, after the initial white calibration frame and the three successive pairs of image frames shown in FIGS. 2C-2H, the stylus location should be determined within $(1/8)^3$, or $1/512$ of the dimension of the display screen. Such accuracy may be set in the stylus control unit as a minimum threshold accuracy for determining the stylus location with respect to the display screen. However, if the light sensor of the stylus is capable of enhanced luminance discrimination, the number of frames needed to determine the stylus location to the desired accuracy may be reduced accordingly.

Furthermore, the stylus input system of embodiments of the present invention does not create an inconvenience for the user. For example, in a conventional display operating with a standard 60 Hz video refresh rate, a single frame takes about 16.67 milliseconds to display. As such, the total time for stylus position determination using the embodiments of the present invention and a preset accuracy threshold of $1/512$ the area of the display screen, is 7 image frames including the initial calibration (i.e. white frame), or approximately 117 milliseconds. Moreover, since the entire display screen is only used during the first through third image frames (FIG. 2B-FIG. 2D) for a total of 50 milliseconds, or $1/20$ of a second, the disruption of the normal image as seen by the user is minimal.

Figure 3:
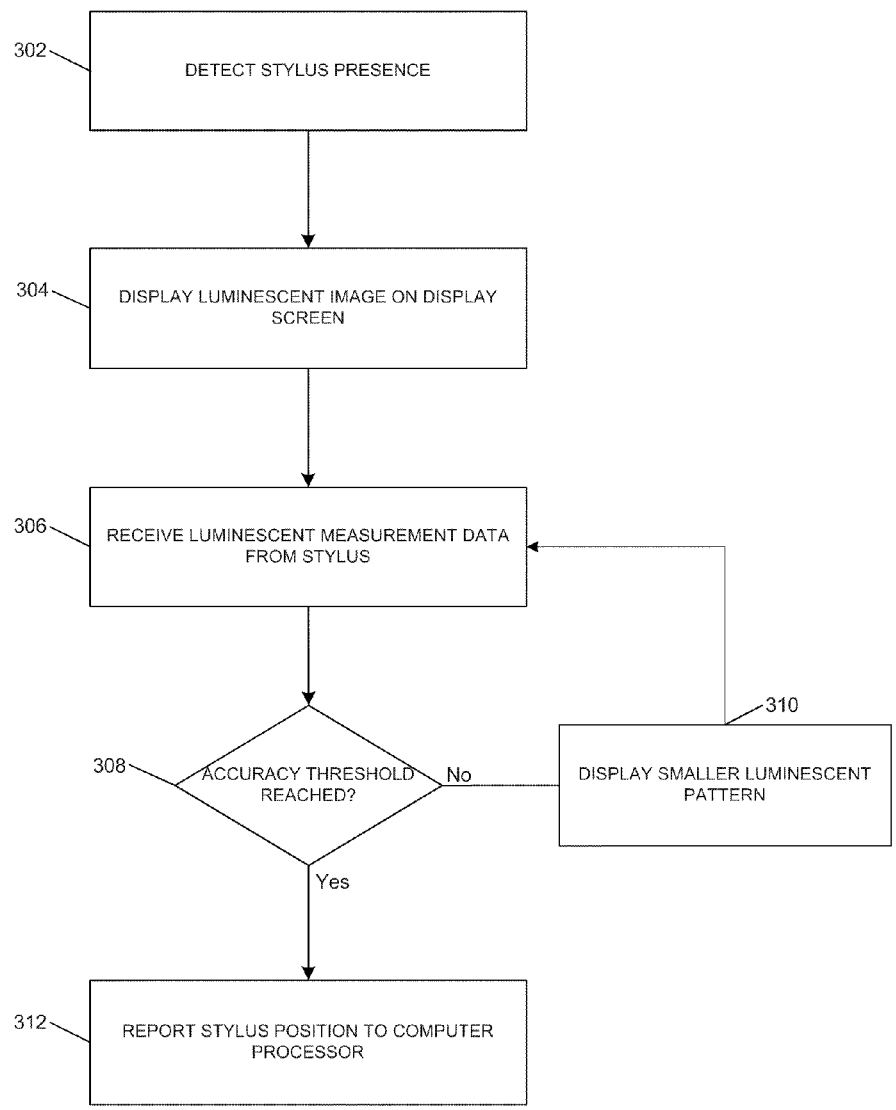
FIG. 3 illustrates the processing steps for stylus control unit of the stylus input system according to an embodiment of the present invention.

FIG. 3 illustrates the processing steps for the stylus control unit of the stylus input system according to an embodiment of the present invention. In step 202, the stylus control unit detects the presence of the stylus by analyzing pressure applied to the display screen or by sensing the light output by the display screen as described above. Next, in step 304, the stylus control unit executes an interrupt operation of the current video source and outputs a series of successive frames of luminescent images or patterns for display on the display screen. The light sensor of the stylus analyzes the region of the luminescent image or pattern within its field of view and transmits luminescent measurement data to the stylus control unit in step 306. In step 308, the stylus control unit determines whether an accuracy threshold has been met by analyzing the luminescent measurement data as described in detail above. If the threshold has not been met, then in step 310 the stylus control unit displays a smaller pair of luminescent images having a central area aligned with the previously-determined approximate "x" and "y" locations of the stylus. On the other hand, if the stylus control unit determines that the threshold has been met, then in step 312, the stylus control unit reports the approximate position of the stylus to the computer processor so as to facilitate touch interaction between the stylus held by the user and the display screen.

Embodiments of the present invention provide a stylus input system for a display device. In particular, a stylus control unit is configured to display frames of luminescent images or patterns having varying luminescent levels that are detectable by a stylus. Successive pairs of image frames are displayed smaller than previously displayed pairs of image frames, enabling detection of the stylus location to reach a desired accuracy. When the accuracy reaches a preset threshold, the stylus control unit sends an approximate position of the stylus to the computer processor.

Many advantages are afforded by the stylus input system according to embodiments of the present invention. For instance, the stylus input system includes two simple hardware components that are easily adaptable to almost any computing environment involving a display. Furthermore, installation and operation of the stylus control unit and stylus does not require a skilled technician, and therefore ordinary users may incorporate these components into existing systems effortlessly and with little to no lead time. Still further, the above-described solution is extremely cost-effective as both the stylus control unit and stylus require little operating parts and is easy to manufacture. Moreover, since the sensor of the stylus does not detect color, costs can be further reduced.

Furthermore, while the invention has been described with respect to exemplary embodiments, one skilled in the art will recognize that numerous modifications are possible. For example, although exemplary embodiments depict a desktop computer as the exemplary computing environment, the invention is not limited thereto. For example, the stylus input system may be applied in a notebook computer, netbook, a tablet personal computer, a cell phone, or any other electronic device having a configurable display unit and processor.

Furthermore, the image frames may be refined by switching from a solid and shaded pattern frame to other patterns. For example, a crosshair or checkered pattern may be displayed and then detected by the stylus sensor, therefore enabling a more precise location to be determined within the field of view of the stylus sensor. Thus, although the invention has been described with respect to exemplary embodiments, it will be appreciated that the invention is intended to cover all modifications and equivalents within the scope of the following claims.

What is claimed is:

1. A method for enabling stylus input on a display device coupled to a computer processor, the method comprising:
   detecting, via a stylus control unit coupled with the computer processor and display device, the presence of a stylus within a display area of the display device, wherein a current video source associated with the display device is interrupted upon detection of a stylus within the display area of the display device;
   displaying, via a stylus control unit, a pair of graphical image frames on the display device, wherein the pair of image frames comprises of a first image frame including a first luminescent image and a second image frame including a second luminescent image, wherein the image frames interrupt a current video source of the display;
   receiving, at the stylus control unit, luminescent measurement data transmitted from the stylus; and
   determining, via a stylus control unit, stylus position information based on the received luminescent measurement data.

2. The method of claim 1, wherein at least one luminescent image includes a different luminance level at different regions of the display device.

3. The method of claim 2, wherein the stylus includes a sensor configured to measure varying levels of luminance within the at least one luminescent image.

4. The method of claim 3, wherein the sensor is a CMOS active pixel sensor that does not detect color.

5. The method of claim 1, wherein prior to transmitting the stylus position information:
   determining, via the stylus control unit, if a predetermined accuracy threshold has been reached.

6. The method of claim 5, wherein if the predetermined accuracy threshold has not been reached:
   repeatedly displaying, via the stylus control unit, a subsequent pair of image frames that are smaller than the previously displayed image frames up until the accuracy threshold is reached.

7. The method of claim 6, wherein based on the luminescent data received from the stylus, a y coordinate of the stylus with respect to the display screen is determined by the first luminescent image in the pair of image frames, and an x coordinate of the stylus with respect to the display screen is determined by the second luminescent image in the pair of image frames.

8. The method of claim 7, wherein a central area of each successive pair of image frames is aligned with the determined x coordinate and the determined y coordinate of the stylus associated with the previous pair of it gage frames.

9. A system comprising:
   a display;
   a processor coupled to the display;
   a stylus control unit coupled to the display and processor; and
   a stylus wirelessly connected to the stylus control unit, wherein the stylus control unit is configured to display a pair of graphical image frames upon detection of the presence of the stylus within a display area of the display, wherein a current video source associated with the display is interrupted by the stylus control unit upon detection of a stylus within the display area of the display device; and
   wherein the pair of image frames comprises of a first image frame including a first luminescent image and a second image frame including a second luminescent image.

10. The system of claim 9, wherein at least one luminescent image includes different luminance levels at different regions of the display screen.

11. The system of claim 10, wherein the stylus includes a sensor configured to measure varying levels of luminance within the at least one luminescent image.

12. The system of claim 11, wherein the sensor is a CMOS active pixel sensor that does not detect color.

13. The system of claim 9, wherein prior to transmitting the stylus position information, the stylus control unit determines if a predetermined accuracy threshold has been reached.

14. The system of claim 13, wherein if the predetermined accuracy threshold has not been reached, then the stylus control unit repeatedly displays a subsequent pair of image frames that are smaller than the previously displayed image frames up until the accuracy threshold is reached.

15. The system of claim 14, wherein based on the luminescent data received from the stylus, a y coordinate of the stylus with respect to the display screen is determined by the first luminescent image in the pair of image frames, and an x coordinate with respect to the display screen is determined by the second luminescent image in the pair of image frames.

16. The system of claim 15, wherein a central position of each successive pair of image frames is aligned with the determined x coordinate of the stylus and the determined y coordinate of the stylus associated with the previous pair of image frames.

17. A computer readable storage medium containing an executable program that, when executed by a processor, causes the processor to:
   detect the presence of a stylus within a display area of a display device;
   interrupt a current video source associated with the display device based on the detected stylus
   display a pair of graphical image frames on the display device, wherein the pair of image frames comprises of a first image frame including a first luminescent image and a second image frame including a second luminescent image;
   receive luminescent measurement data transmitted from the stylus; and
   determine stylus position information based on the received luminescent measurement data.

18. The computer readable storage medium of claim 17, wherein at least one luminescent image includes a different luminance level at different regions of the display device.

19. The computer readable storage medium of claim 17, further comprising the software causing the processor to:
   determine if a predetermined accuracy threshold has been reached, and
   repeatedly display a subsequent pair of image frames that are smaller than the previously displayed image frames up until the accuracy threshold is reached.

20. The computer readable storage medium of claim 19, wherein based on the luminescent data received from the stylus, a y coordinate of the stylus with respect to the display screen is determined by the first luminescent image in the pair of image frames, and an x coordinate of the stylus with respect to the display screen is determined by the second luminescent image in the pair of image frames; and
   wherein a central area of each successive pair of image frames is aligned with the determined x coordinate and the determined y coordinate of the stylus associated with the previous pair of image frames.

* * * * *

UNITED STATES PATENT AND TRADEMARK OFFICE
CERTIFICATE OF CORRECTION

PATENT NO. : 8,436,837 B2
APPLICATION NO. : 12/712428
DATED : May 7, 2013
INVENTOR(S) : Bob Myers Page 1 of 1

It is certified that error appears in the above-identified patent and that said Letters Patent is hereby corrected as shown below:

In the Claims:

In column 6, line 7, in Claim 8, delete "it gage" and insert -- image --, therefor.

Signed and Sealed this
Twentieth Day of August, 2013

Teresa Stanek Rea
*Acting Director of the United States Patent and Trademark Office*